Figure 1:
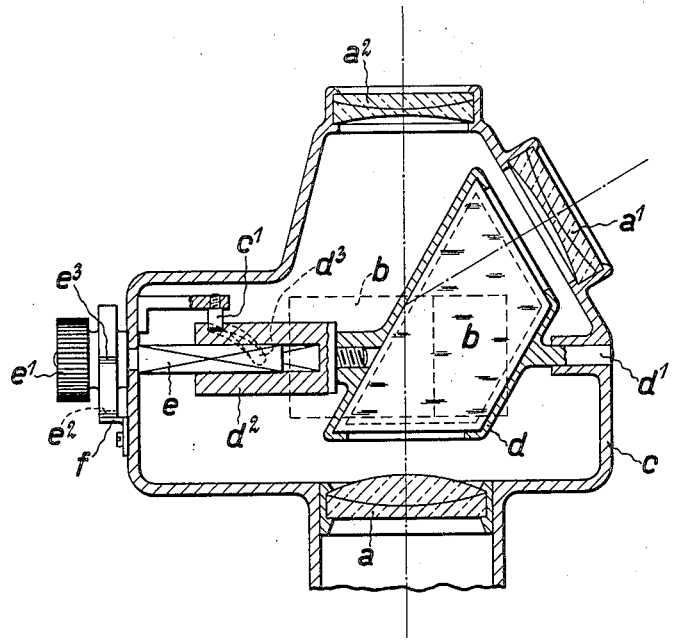

Aug. 19, 1924.

H. ERFLE

TELESCOPE

Filed Aug. 26, 1922

1,505,878

Inventor:
Heinrich Erfle

Patented Aug. 19, 1924.

1,505,878

UNITED STATES PATENT OFFICE.

HEINRICH ERFLE, OF JENA, GERMANY, ASSIGNOR TO THE FIRM CARL ZEISS, OF JENA, GERMANY.

TELESCOPE.

Application filed August 26, 1922. Serial No. 584,562.

*To all whom it may concern:*

Be it known that I, HEINRICH ERFLE, a citizen of the German Empire, and residing at Jena, Germany, have invented a new and useful Telescope, of which the following is a specification.

The present invention relates to a telescope having a prism system which contains two lateral boundary surfaces, parallel to each other and an optional number of reflecting surfaces, inclined to these boundary surfaces. According to the invention there is disposed a changing device in order to bring the prism system from one position in which it divides the telescope axis into two parts, which embrace an angle deviating from zero, into a second position in which its lateral boundary surfaces are perpendicular to one of those two parts of the telescope axis, i. e. in which the prism system only acts as a plane-parallel glass plate. This affords the possibility of passing over from the one position of the prism system to the other without substantially causing the prism system to change its location. Hence, it is not necessary to fix on the telescope a prism casing which is considerably larger than the prism system itself.

If the prism system be disposed on the side of the light entrance of the telescope, it is, e. g. possible to afford to an observer the look-out in two different directions in succession. Another advantageous constructional form of the invention results if one of the reflecting surfaces of the prism system be devised in such a way that it reflects only one part of the light, whilst it allows to pass the other one, if therefore half of this reflecting surface be silvered and if the prism system be disposed in such a way that in its one position it divides the ray pencil system emanating from the telescope objective into two partial systems, each of which is transmitted to one of two oculars. By bringing the prism system with the aid of the aforesaid changing device into its second position in which its lateral boundary surfaces are perpendicular to that part of the telescope axis which lies in front of the prism system, it is possible, on the oculars being suitably disposed, to dispense with the observer at the one ocular and to place the full luminosity at the disposal of the observer at the other ocular. In that case the prism is suitably formed by a pentagonal prism, of the two reflecting surfaces of which the one is so devised as to reflect only one part of the rays impinging on it whilst it allows to pass the other part, a glass wedge being cemented on this reflecting surface, the outer surface of which is parallel to the first named reflecting surface of the pentagonal prism.

In order to bring the prism system from one position into the other, it is generally necessary to impart to it a rotation about 90° and a displacement in the direction of the axis of rotation. These two motions may be performed by screw motion. In the case of large dimensions of the prism system a single rotation may be sufficient.

Figure 2:
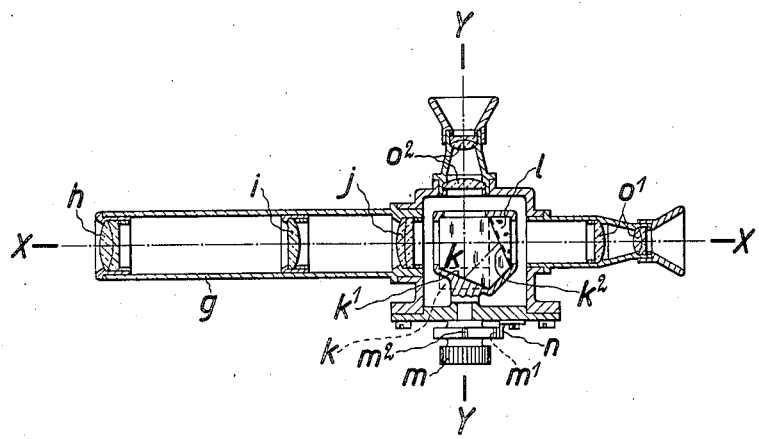

Fig. 1 shows as the first constructional example of the invention the head of an upright telescope in a section through the optical axis of the instrument. Fig. 2 shows as the second constructional example of the invention a telescope in a section through its optical axis.

The constructional example shown in Fig. 1 is to afford to an observer a look-out in the lateral and in the height direction in succession. A collective lens member $a$, two dispersive lens members $a^1$ and $a^2$ and a singly reflecting prism $b$ form the objective system of the telescope. The lens members are all rigidly disposed within the telescope casing $c$, the arrangement being such that the two look-out axes embrace an acute angle. The prism $b$ is disposed in a mount $d$ which is provided with two bearing pivots, the one of which, $d^1$, is cylindrical and supported within the casing $c$, whilst the other one, $d^2$, is devised as a hollow pivot and guided on a pivot $e$, rotatably supported within the casing and having a rectangular cross section. Besides, the axis of the cylindrical pivot $d^1$ coincides with the axis of rotation of the pivot $e$, thereby lying in the plane determined by the two look-out axes and being directed perpendicularly to the telescope axis. At its outer circumference the hollow pivot $d^2$ is provided with a screw-groove $d^3$ in which engages a pin $c^1$, fixed on the casing $c$. In order to bring the prism from the position shown in the drawing by continuous lines, in which it mediates the lateral look-out, into its second position of use shown in the drawing by dotted lines, in which it affords the look-out upwards, the pivot $e$ must be rotated about 90° by means of a milled head $e^1$, whereby the prism undergoes, on the one hand, owing to the straight guide of the hollow pivot $d^2$ on the pivot $e$, a rotation about 90° and, on the other hand, owing to the pin $c^1$ engaging in the groove $d^3$, a displacement in the direction of the axis of rotation. The prism is protected from incidental rotations by a spring $f$, which is fixed on the casing $c$ and which in the position of the prism, corresponding to the lateral look-out, engages in a notch $e^2$ and in the position of the prism, corresponding to the look-out upwards, in a notch $e^3$ of the milled head $e^1$.

In the constructional example shown in Fig. 2 there are fixed within a casing $g$ an objective $h$, a collective lens $i$ and a reversing lens $j$. Directly behind this reversing lens there is a separating prism which consists of a pentagonal prism $k$ deflecting by 90° and of a glass wedge $l$ cemented to this prism. The angle of this wedge is so chosen that the outer surface of the wedge is parallel to the entrance surface of the prism. The surface $k^1$ of the prism $k$ is silvered all over, whilst of the surface $k^2$ of the prism $k$, upon which the glass wedge $l$ is cemented, only a number of strips of uniform width are silvered which are separated by uncoated strips of the same width. The separating prism $k$, $l$ is supported rotatably within the casing $g$ about an axis Y—Y, which intersects perpendicularly the telescope axis X—X, the prism being rotatable by 90° by means of a milled head $m$. The latter is provided with two notches $m^1$ and $m^2$ and, in addition, there is fixed on the casing $g$ a spring $n$ which is capable of meshing with one of the two notches and then protects the separating prism from incidental rotations. Behind the separating prism $k$, $l$ there are disposed two oculars $o^1$ and $o^2$ in such a way that the axis of the ocular $o^1$ coincides with the axis X—X and the axis of the ocular $o^2$ with the axis Y—Y.

If the separating prism $k$, $l$ assumes the position shown in the drawing by continuous lines in which the spring $n$ engages in the notch $m^1$, both oculars $o^1$ and $o^2$ are operative. If, however, the separating prism occupies the position which is shown by dotted lines and in which the spring $n$ engages in the notch $m^2$, the observation can only take place through the ocular $o^1$. In this case the image presented to the observer is brighter owing to the suppression of the ray division.

I claim:

1. In a telescope a prism system, containing two lateral boundary surfaces parallel to each other and a number of reflecting surfaces inclined to these boundary surfaces, the said prism system being rotatable so as to occupy two positions, in the one of which the telescope axis being divided by the reflection on the said reflecting surfaces into two parts embracing an angle and in the other one of which the prism system's lateral boundary surfaces being perpendicular to one of these two parts of the telescope axis so as to be traversed by the rays passing through the telescope, and the said telescope further containing a changing device adapted to bring the said prism system from the one position into the other.

2. In a telescope two oculars, a prism system, containing two lateral boundary surfaces parallel to each other and a number of reflecting surfaces perpendicular to these boundary surfaces, one of the said reflecting surfaces being devised in such a way as to reflect only one part of the light, whilst it allows to pass the other, the said prism system being adapted to occupy two positions, in the one of which the ray pencil system emanating from the telescope objective is divided into two partial systems, each of which is transmitted to one of the two oculars and in the other one of which its lateral boundary surfaces are perpendicular to that part of the telescope axis which lies in front of the said prism system, and the said telescope further containing a changing device adapted to bring the said prism system from the one position into the other.

3. In a telescope two oculars, a pentagonal prism, containing two lateral boundary surfaces parallel to each other and two reflecting surfaces perpendicular to these boundary surfaces, one of the said reflecting surfaces being devised in such a way as to reflect only one part of the rays impinging on it, whilst it allows to pass the other, a glass wedge cemented on this reflecting surface, the outer surface of this wedge being parallel to the other reflecting surface, the said pentagonal prism being rotatable about an axis perpendicular to that part of the telescope axis, which lies in front of the said prism, and parallel to a plane perpendicular to the said reflecting surfaces, the prism thereby being adapted to occupy two positions, in the one of which the ray pencil system penetrating the telescope objective is divided into two partial systems, each of which is transmitted to one of the two oculars, the axis of the one of the oculars coinciding with the said part of the telescope axis, and in the other position of which the lateral boundary surfaces of the separating prism are perpendicular to the said part of the telescope axis, and the said telescope further containing a changing device adapted to rotate the pentagonal prism about its axis of rotation.

HEINRICH ERFLE.

Witnesses:
  CANE KRÜGER,
  FRITZ SANDER.